(12) United States Patent
Videcoq

(10) Patent No.: US 9,726,478 B2
(45) Date of Patent: Aug. 8, 2017

(54) DEVICE FOR ACQUISITION AND MEASUREMENT OF GEOMETRIC DATA OF AT LEAST ONE MOTIF ASSOCIATED WITH A SPECTACLE FRAME GLASS AND ASSOCIATED METHOD

(71) Applicant: Luneau Technology Operations, Pont de l'Arche (FR)

(72) Inventor: Jean-Jacques Videcoq, Pavilly (FR)

(73) Assignee: Luneau Technology Operations, Pont de l'Arche (FR)

( * ) Notice: Subject to any disclaimer, the term of this patent is extended or adjusted under 35 U.S.C. 154(b) by 251 days.

(21) Appl. No.: 14/547,926

(22) Filed: Nov. 19, 2014

(65) Prior Publication Data
US 2015/0138350 A1   May 21, 2015

(30) Foreign Application Priority Data

Nov. 20, 2013   (FR) ...................... 13 61422

(51) Int. Cl.
| | | |
|---|---|---|
| *H04N 9/47* | (2006.01) | |
| *H04N 7/00* | (2011.01) | |
| *H04N 7/18* | (2006.01) | |
| *G01B 11/25* | (2006.01) | |
| *G01B 11/24* | (2006.01) | |

(52) U.S. Cl.
CPC .......... *G01B 11/254* (2013.01); *G01B 11/24* (2013.01)

(58) Field of Classification Search
CPC ..................................... G01B 11/24
USPC .......................................... 348/136
See application file for complete search history.

(56) References Cited

U.S. PATENT DOCUMENTS

2002/0176756 A1* 11/2002 Gottschald .............. B24B 9/148
                                                          409/132

FOREIGN PATENT DOCUMENTS

| EP | 1250979 | 10/2002 |
|---|---|---|
| FR | 2 854 268 | 10/2002 |
| WO | WO 96/29177 | 9/1996 |

* cited by examiner

*Primary Examiner* — Hung Dang
*Assistant Examiner* — Girumsew Wendmagegn
(74) *Attorney, Agent, or Firm* — Davidson, Davidson & Kappel, LLC

(57) ABSTRACT

This data acquisition and measuring device for acquisition and measurement of geometric data for at least one motif associated with a glass for a spectacle frame, for the manufacture of ophthalmic lenses, similar or complementary to the glass, comprises a support capable of holding the glass, an illuminator for illuminating this support, a video imaging system for capturing images oriented towards the support and capable of capturing at least two images of the contour of the glass placed on the support, and a signal analyzer and processor that receive at the input each image captured by the video imaging system. The analyzer and processor is capable of measuring the distance from at least one point of the form contour of the glass to a reference plane based on said images.

13 Claims, 2 Drawing Sheets

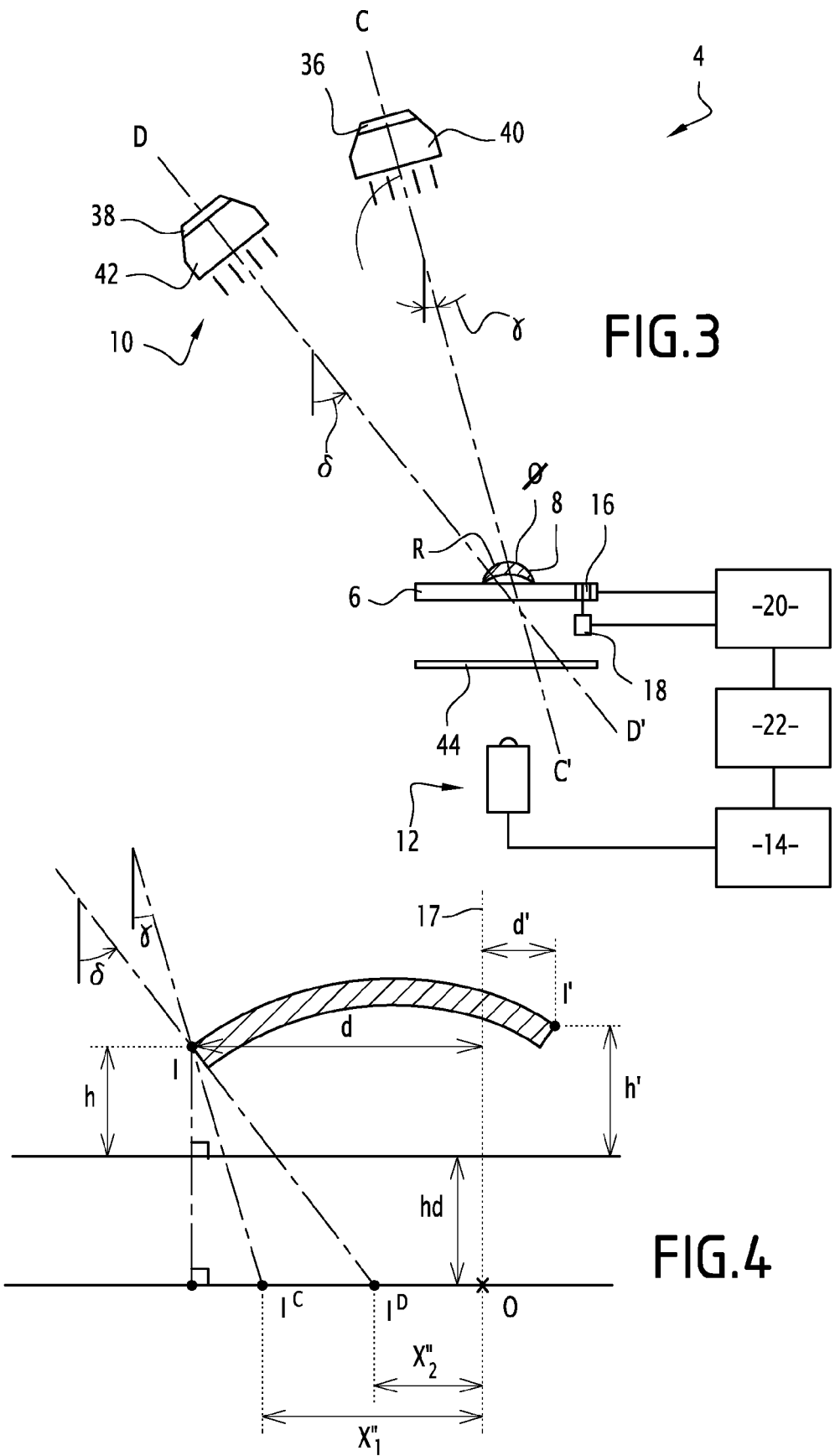

US 9,726,478 B2

DEVICE FOR ACQUISITION AND MEASUREMENT OF GEOMETRIC DATA OF AT LEAST ONE MOTIF ASSOCIATED WITH A SPECTACLE FRAME GLASS AND ASSOCIATED METHOD

This claims the benefit of French Patent Application FR 13 614 22, filed Nov. 20, 2013 and hereby incorporated by reference herein.

The present invention relates to a data acquisition and measuring device for acquisition and measurement of geometric data for at least one form motif associated with a glass for a spectacle frame, for the manufacture of ophthalmic lenses, similar or complementary to the glass, the device being of the type comprising:

a support capable of holding the glass;

the illumination means for illuminating the support;

a video imaging system for capturing images oriented towards the support and capable of capturing at least two images of the contour of the glass placed on the support; and the signal analysis and processing means that receive at the input each image captured by the video imaging system.

It also relates to a data acquisition and measurement method carried out with a data acquisition and measuring device of the aforementioned type.

Such a device is in particular intended for measuring the contour of a spectacle frame glass for the purposes of producing an ophthalmic lens that is suitable for the spectacle frame. This glass may be an optical glass or a display glass.

A display glass is a glass made out of transparent plastic material that is not corrective, having the form contour, and possibly a hole, similar to those of an ophthalmic lens (or glass). An optical glass is a glass made out of a rigid, transparent, corrective material, having the form contour, and possibly a hole, suitable for inserting said glass in a spectacle frame. The optical glass is for example made out of a mineral material, plastic material, composite or resin, and includes two surfaces with predefined shapes, for example spherical, cylindrical or prismatic.

The capturing of a representative image of the glass makes it possible to calculate the form of the contour of this object.

BACKGROUND

Such a device is for example known from the patent FR-A-2 854 268. In this document, the video imaging system for capturing images is constituted of a single video camera and provides the ability to obtain a two dimensional image of the profile.

SUMMARY OF THE INVENTION

However, depending upon the internal and external curving of the glass and depending on its position on the support, the two dimensional image of the glass may vary. This requires great care and attention in the appropriate positioning of the glass on the support with respect to both the surface facing the support as well as its orientation in the general plane thereof, failing which there is a risk of having to discard the ophthalmic lens produced.

It is an object of the present invention to provide the means for ensuring a reliable reconstruction of the form contour of the glass no matter what its orientation and regardless of the support used.

The present invention provides a device of the aforementioned type, characterised in that the analysis and processing means is capable of measuring the distance from at least one point of the form contour of the glass to a reference plane based on the images captured by the video imaging system.

In accordance with particular embodiments of the invention, the device comprises one or more of the following characteristic features, taken into consideration individually or in accordance with any technically possible combination:

it includes moving means for moving the support about an axis of rotation of the support relative to the video imaging system and/or the illumination means;

the reference plane is orthogonal to the axis of rotation of the support;

a first of said images is the projection of the form contour of the glass, along a first direction of projection, on a first plane of projection, a second of said images is the projection of the form contour of the glass, along a second direction of projection, on a second plane of projection, and the first and second directions of projection form a non-zero angle therebetween;

the first and second directions of projection form a plane containing the normal to the reference plane;

the acute angles measured from the normal to the reference plane up to each of the directions of projection have the same counter clockwise directional orientation;

the video imaging system is capable of viewing the form contour of the glass along a first and a second sighting axis, the first image being constituted of the view of the form contour of the glass along the first sighting axis and the second image being constituted of the view of the form contour of the glass along the second sighting axis;

the first sighting axis is parallel to the axis of rotation of the support;

the video imaging system comprises of a first camera and a second camera, each camera being adapted for viewing the form contour of the glass along a specific sighting axis of its own;

the video imaging system comprises a single camera capable of capturing the first image and the second image;

a projection screen is interposed between the video imaging system and the support, the illumination means are capable of illuminating the glass along a first and a second direction of illumination, and the first image is formed by the shadow of the form contour of the glass on the projection screen as a result of the illumination of the glass along the first direction of illumination, the second image being formed by the shadow of the form contour of the glass on the projection screen as a result of the illumination of the glass along the second direction of illumination;

The present invention also relates to a data acquisition and measurement method carried out with a data acquisition and measuring device as defined here above, characterised in that the method includes the following steps:

providing the glass, said glass having a form contour appropriately adapted to the frame and two surfaces;

placing the glass in an initial position on the support of the data acquisition and measurement device;

capturing images; and measuring the distance from at least one point of said form contour to the reference plane based on the images.

According to particular embodiments of the invention, the method includes one or more of the following characteristic features, taken into consideration individually or in accordance with any technically possible combination:

the video imaging system is capable of viewing the form contour of the glass along a first and a second sighting axis, the first image being constituted of the view of the form contour of the glass along the first sighting axis and the second image being constituted of the view of the form contour of the glass along the second sighting axis and the measuring step includes a sub step d1) of measuring the distance from one point of form contour of the glass contained in the plane defined by the first and second sighting axes to the reference plane, said sub step comprising of the following sub steps:

d11) measuring the distance, viewed along the first sighting axis, between the point of the form contour and an identifying reference point of the reference plane; and d12) measuring the distance, viewed along the second sighting axis between the point of the form contour and an identifying reference point of the reference plane.

the distance from the point of the form contour to the reference plane is given by the following formula:

$$h = \frac{\left|\frac{X'_2}{\cos(\beta)} - \frac{X'_1}{\cos(\alpha)}\right|}{|\tan(\alpha) - \tan(\beta)|},$$

where:

h is the distance from the point of the form contour to the reference plane;

α is the acute angle oriented from an axis normal to the reference plane to the first sighting axis;

β is the acute angle oriented from an axis normal to the reference plane to the second sighting axis;

$X'_1$ is the distance, viewed along the first sighting axis, between the point of the form contour and the identifying reference point of the reference plane; and $X'_2$ is the distance, viewed along the second sighting axis, between the point of the form contour and the identifying reference point of the reference plane;

a projection screen is interposed between the video imaging system and the support, the illumination means are capable of illuminating the glass along a first and a second direction of illumination, the first image being formed by the shadow of the form contour of the glass on the projection screen as a result of the illumination of the glass along the first direction of illumination, and the second image being formed by the shadow of the form contour of the glass on the projection screen as a result of the illumination of the glass along the second direction of illumination, and the measuring step includes a sub step d2) of measuring the distance from a point of form contour of the glass contained in the plane defined by the first and second directions of illumination to the reference plane, said sub step comprising of the following sub steps:

d21) measuring the distance between a reference point of the projection screen and the projection, along the first direction of illumination, of the point of the form contour on the projection screen; and d22) measuring the distance between a reference point of the projection screen and the projection, along the second direction of illumination, of the point of the form contour on the projection screen;

the distance from the point of the form contour to the reference plane is given by the following formula:

$$h = \frac{|X''_1 - X''_2|}{|\tan(\delta) - \tan(\gamma)|} - h_d,$$

where:

h is the distance from the point of the form contour to the reference plane;

$h_d$ is the distance between the reference plane and the projection screen;

γ is the acute angle oriented from an axis normal to the projection screen to the first direction of emission;

δ is the acute oriented from an axis normal to the projection screen to the second direction of emission;

$X''_1$ is the distance between the reference point of the projection screen and the projection, along the first direction of illumination, of the point of the form contour on the projection screen; and $X''_2$ is the distance between the reference point of the projection screen and the projection, along the second direction of illumination, of the point of the form contour on the projection screen;

the reference point is a point of intersection between the reference plane and an axis of rotation of the support;

the projection screen is orthogonal to an axis of rotation of the support;

the method includes a step e) of moving of the support about an axis of rotation of the support;

the steps d) and e) are repeated until the total angle of displacement of the support from the initial position of the glass reaches 180°.

The present invention also relates to a device as previously defined above, comprising a control module capable of implementing the steps c) and d) of a method as defined here above.

BRIEF DESCRIPTION OF THE DRAWINGS

The invention will be better understood upon reading the description which follows, given purely by way of example and with reference being made to the accompanying figures, in which:

FIG. 3 is a schematic side view of a geometric data acquisition device according to a second embodiment of the invention;

FIG. 4 is a schematic side view of a detail of the geometric data acquisition device shown in FIG. 3.

DETAILED DESCRIPTION

Figure 1:
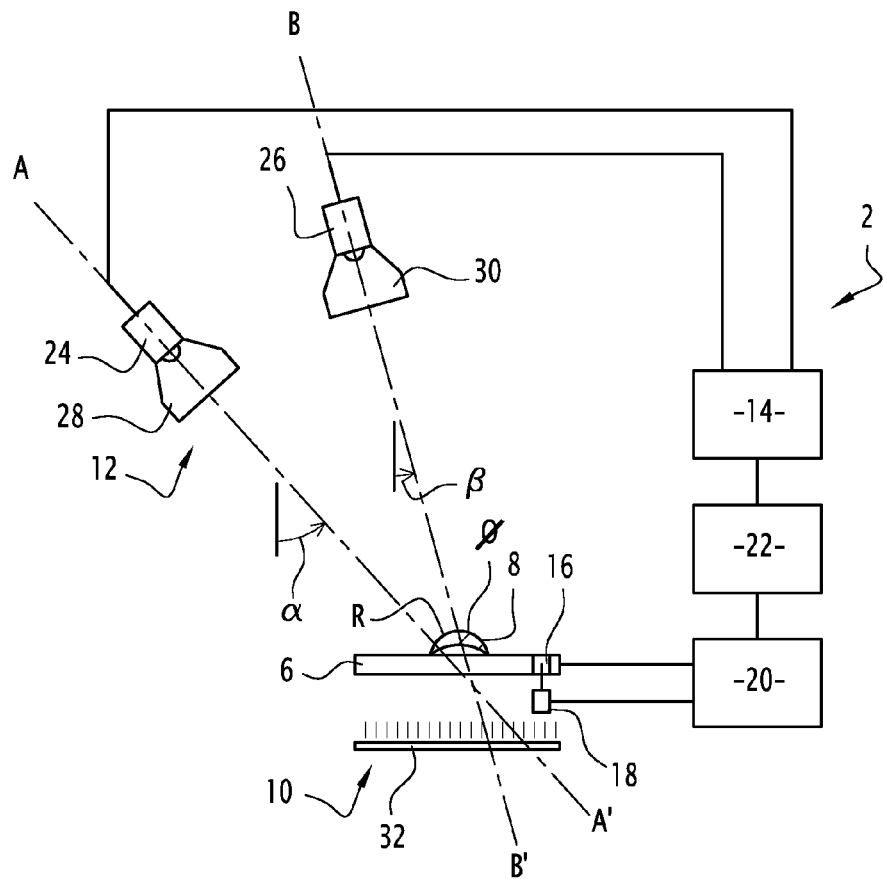
FIG. 1 is a schematic side view of a geometric data acquisition device according to a first embodiment of the invention.

Each of the geometric data acquisition devices 2, 4 represented in the FIGS. 1 and 3 is designed to acquire and measure geometric data of at least one form motif associated with a glass of a spectacle frame, for the manufacture of ophthalmic lenses similar or complementary to the glass.

Figure 2:
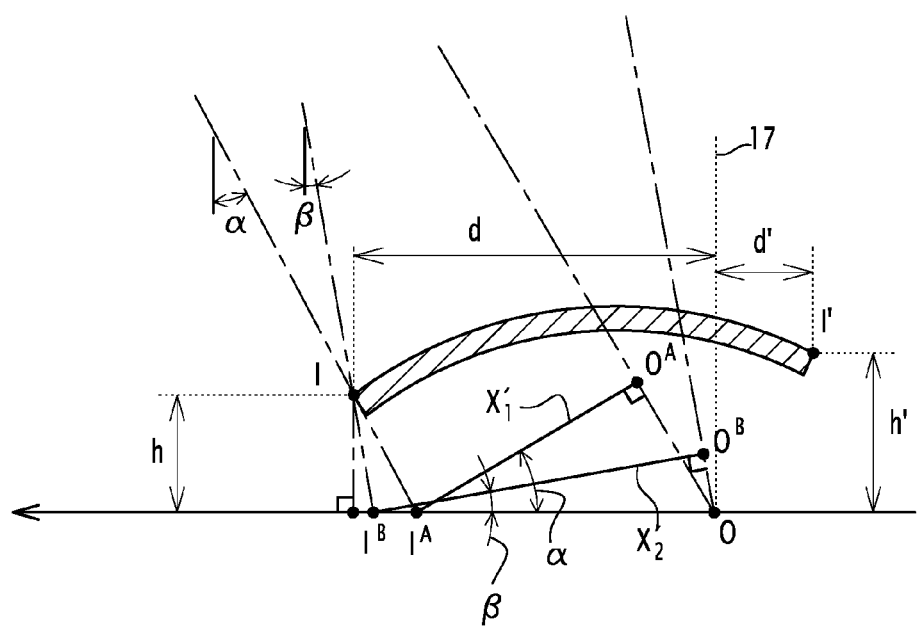
FIG. 2 is a schematic side view of a detail of the geometric data acquisition device shown in FIG. 1.

Each of the geometric data acquisition devices 2, 4, includes:

a transparent glass plate 6, flat and horizontal, constituting a support for the glass 8 to be analysed;

on one side of the support plate 6, the illumination means 10 for illuminating the glass 8, capable of illuminating the glass 8 in its entirety;

on the other side of the support plate 6, a video imaging system 12 for capturing image oriented towards the glass 8;

a signal analysis and processing unit 14 for analysing and processing signals and connected to the video imaging system 12;

an actuator 16 for driving the support plate 6 in rotation about an axis of rotation 17 (FIGS. 2 and 4);

an encoder 18 for measuring this rotation;

a control module 20 for controlling the position of the support plate 6 by means of the actuator 16 and receiving the information relating to the position of the support plate 6 by means of the encoder 18; and a device control module 22 for controlling the geometric data acquisition device 2, 4.

The support plate 6 preferably has a non-slip top surface. By way of a variant, the support plate 6 carries a support member defining three points of contact or a circular line of contact with the glass 8.

The video imaging system 12 is designed to capture images of the form contour of the glass 8 illuminated by the illumination means 10. The unit 14 is programmed to record and save these images, to measure the distances over these images and to calculate the distance h from at least one point I, I' of the form contour of the glass 8 to a reference plane, orthogonal to the axis of rotation 17 of the support plate 6, based on said images, as well as for calculating the distance d from said point of I, I' to the axis of rotation 17 of the support plate 6. The unit 14 is also programmed for visibly identifying on each of these images an axis of frame mounting of the glass 8, said frame mounting axis being typically embodied by a line drawn over the glass 8, and for visibly identifying the position of the or each point I, I' relative to the frame mounting axis.

It should be noted that, in a known manner, the axis of frame mounting of a glass is an axis parallel to a tangent to the circles of the mounting frame on which said glass is designed to be mounted.

A first of the images captured by the video imaging system 12 is the projection of the form contour of the glass 8, along a first direction of projection, on a first plane of projection. A second of the images captured by the video imaging system 12 is the projection of the form contour of the glass 8, along a second direction of projection, on a second plane of projection. The first and second directions of projection form a non-zero angle between them. The first and second directions of projection form a plane containing the axis of rotation 17 of the support plate 6.

The distances measured over said images are thus the projections of real distances in accordance with said directions of projection, on said first and second planes of projection.

In all of the sections that follow, the reference plane shall be deemed to be that of the support plate 6.

In the example shown in FIG. 1, the video imaging system 12 comprises two video cameras 24, 26 each respectively associated with a collimator 28, 30 and the illumination means 10 include a planar and horizontal diffuser 32.

The first camera 24 is capable of viewing the glass 8 along a first sighting axis AA'. In other words, the collimator 28 is adapted for causing the converging of the light beams oriented parallel to the first sighting axis AA' towards the sensor of the first camera 24. The second camera 26 is capable of viewing the glass 8 along a second sighting axis BB'. In other words, the collimator 30 is adapted for causing the converging of the light beams oriented parallel to the second sighting axis BB' towards the sensor of the second camera 26.

The first direction of projection is the first sighting axis AA', the first projection plane being a plane orthogonal to the first sighting axis AA'. The second direction of projection is the second sighting axis BB', the second projection plane being a plane orthogonal to the second sighting axis BB'.

The illumination means 10 illuminate the glass 8 and are arranged under the support plate 6.

The cameras 24, 26 are arranged above the support plate 6, and positioned pointing downwards. Each respective sighting axis AA' and BB' makes a predetermined acute angle with the axis of rotation 17 of the support plate 6, respectively $\alpha$ and $\beta$. These angles are oriented and are measured from the axis of rotation 17 of the support plate 6. The axes AA' and BB', form a plane containing the axis of rotation 17 of the support plate 6.

Preferably, as shown the angles $\alpha$ and $\beta$ have the same counter clockwise directional orientation. This enables the measurement of the heights h of the points of the form contour of the glass 8 by being unconstrained by the thickness of the glass 8.

Advantageously, one of the angles $\alpha$, $\beta$ is zero.

In this example, the images of the form contour of the glass 8 consist of the views of the form contour of the glass 8 along the first and second sighting axes AA', BB'.

The field of view of each camera 24, 26 covers at least a radius R of the glass 8, connecting the centre O of rotation of the support plate 6 to a point I of the form contour of the glass 8. This radius R is included in the plane defined by the directions AA' and BB' and comprising the centre of rotation U. The image of the point I on the image captured by each camera 24, 26 is respectively $I^A$, $I^B$.

Optionally, the field of view of each camera 24, 26 covers a diameter Ø of the glass 8, including the radius R and a point I' of the form contour of the glass 8 diametrically opposite to the point I.

The cameras 24, 26 are designed to record and store each image based on views of the glass 8 through their respective collimator 28, 30 and to transmit said image to the unit 14.

The signal analysis and processing unit 14 is designed to collect the images captured by the video imaging system 12 and to generate the information characteristic of said images.

The operation of the device 2 according to this first embodiment will now be described.

Initially, the operator performs two separate calibrations.

The first calibration consists of visibly identifying the centre of rotation O of the support plate 6. In order to do this, the operator draws an identifying reference mark on the support plate 6, for example a point, off centre from the axis of rotation 17. Then by means of the actuator 16, the support plate 6 is caused to turn by 120°, three times. For each angular position of the support plate 6, the analysing unit 14 records the position, as viewed by each of the cameras 24, 26, of the centroid of the identifying reference mark. The analysing unit 14 thus obtains two triangles, each specific to one of the cameras 24, 26, and calculates for each of these triangles the position of the centroid of said triangle. This centroid constitutes the image of the centre of rotation O of the reference plane viewed by each camera 24, 26, respectively $O^A$ and $O^B$.

By way of a variant, the identifying reference mark is a constituent element of the support plate 6. The first calibration is thus automatic, that is to say that the steps of rotation of the support plate 6 and recording of the position of the identifying reference mark is done automatically, without intervention by the operator.

The second calibration consists of a metric calibration of the cameras 24, 26. In other words, each pixel of the screen of the camera is assigned a metric value as measured at the level of the support plate 6. For this purpose, the operator places gauges whose sizes are known on the support plate 6.

Then, the glass 8 is placed on the support plate 6 on one of the surfaces thereof, which is concave or convex, according to the needs of the operator.

If the glass 8 is placed on its concave surface, the acquisition to be effected will concern the form contour and the curve of its convex surface. If the glass 8 is placed on its convex surface, the acquisition to be effected will concern the form contour and the curve of its concave surface.

The glass 8 then takes an equilibrium position which depends on the form contour, the resting surface, and the internal and external curves thereof.

The illumination means 10 are then set in operation. The glass 8 then gets illuminated through the support plate 6 on account of the transparency of said support plate 6.

The cameras 24 and 26 each capture in the form of an image a view of the glass 8. These views are different since the cameras 24, 26 have different sighting axes. The captured images are the transmitted to the unit 14.

In reference to FIG. 2, the unit 14 then measures, based on the captured images, the following distances:

the distance $X'_1$, viewed along the first sighting axis AA', between the point I and an identifying reference point of the reference plane, in this case the centre of rotation O; this distance $X'_1$ is the distance between the image points $O^A$ and $I^A$; and the distance $X'_2$, viewed along the second sighting axis BB', between the point I and an identifying reference point of the reference plane, in this case the centre of rotation O; this distance $X'_2$ is the distance between the image points $O^B$ and $I^B$.

The unit 14 then calculates the height h of the point I in relation to the reference plane using the following formula:

$$h = \frac{\left|\frac{X'_2}{\cos(\beta)} - \frac{X'_1}{\cos(\alpha)}\right|}{|\tan(\alpha) - \tan(\beta)|}$$

Then, the unit 14 calculates the distance d from the point I to the axis of rotation 17 of the support plate 6 based on the following formula:

$$d = h * \tan(\alpha) + \frac{X'_1}{\cos(\alpha)}.$$

Finally, the unit 14 visibly identifies the position of the point I in relation to the axis of the frame mounting of the glass 8.

Preferably, in the case where the field of view of each camera 24, 26 covers a diameter of the glass 8, the unit 14 also measures the distance, viewed along the first sighting axis AA', from the point I' to the centre of rotation O, as well as the distance, viewed along the second sighting axis BB', from the point I' to the centre of rotation O. The unit 14 then derives from said measurements the height h' of the point I' relative to the reference plane and the distance d' from the point I' to the axis of rotation 17 by means of formulas similar to those specified here above.

The unit 14 transmits the information relating to the heights h, h', the distances d, d' and the positions of the points I, I' to the control module 22.

The control module 20 then commands the rotation of the support plate 6 by a predetermined angle, for example by 1°. The cameras 24, 26 then capture new images, based on which the unit 14 calculates the heights h, h' of other points I, I' of the form contour of the glass 8 in relation to the reference plane, as well as the distances d, d' from said other points I, I' to the axis of rotation 17, and visibly identifies the positions of said other points I, I' in relation to the frame mounting axis. Then the support plate 6 is again driven in rotation.

These steps are repeated until the radius R or the diameter Ø has traversed the entire form contour of the glass 8.

The total rotation of the support plate 6 necessary to complete this course is 360° if the field of view of each camera 24, 26 is limited to only the radius R. The total rotation of the support plate 6 necessary to complete this course is 180° if the field of view of each camera 24, 26 includes le diameter Ø.

In the example shown in FIG. 3, the video imaging system 12 includes a single camera 34 and the illumination means 10 comprise two light sources 36, 38 each respectively associated with a collimator 40, 42. The geometric data acquisition device 4 further comprises a projection screen 44.

The projection screen 44 is parallel to the support plate 6 and is disposed under the support plate 6. It is translucent. It consists for example of a frosted glass.

The video imaging system 12 for capturing images is disposed under the projection screen 44 and is oriented towards the glass 8. The sighting axis of the camera 34 is preferably orthogonal to the plane of the support plate 6.

Above the support plate 6 are arranged the illumination means 10 for illuminating the glass 8, in a manner such as to illuminate the entirety of the glass 8.

The sources 36, 38 comprise, for example, light emitting diodes.

The first source 36 is capable of illuminating the glass 8 along a first direction of illumination CC'. In other words, the collimator 40 is capable of orienting the light rays emitted by the first source 36 parallelly to the first direction of illumination CC'. The second source 38 is capable of illuminating the glass 8 along a second direction of illumination DD'. In other words, the collimator 42 is capable of orienting the light rays emitted by the second source 38 parallelly to the second direction of illumination DD'.

The light sources 36, 38 are arranged above the support plate 6, and are oriented downwardly. Each respective direction of illumination CC' and DD' makes a predetermined acute angle with the axis of rotation 17 of the support plate 6, respectively γ and δ. These angles are oriented and are measured from the axis of rotation 17 of the support plate 6. The directions CC' and DD' form a plane containing the axis of rotation 17 of the support plate 6.

Preferably, as shown the angles γ and δ have the same counter clockwise directional orientation. This enables the measurement of the heights h of the points of the form contour of the glass 8 by being unconstrained by the thickness of the glass 8.

Advantageously, one of the angles γ, δ is zero.

The field of view of the camera 34 covers at least a radius R of the glass 8, connecting the centre O of rotation of the support plate 6 at a point of the form contour I glass 8. This radius R is included in the plane defined by the directions CC' and DD' and comprising the centre rotation O. Optionally, the field of view of the camera 34 covers a diameter Ø of the glass 8, including the radius R and a point I' of the form contour of the glass 8 diametrically opposite to the point I.

In this example, the images of the form contour of the glass 8 are formed by the shadows of the form contour of the glass 8 along the first and second directions of illumination CC' and DD'. The first direction of projection thus is constituted of the first direction of illumination CC', the first projection plane being the plane of the projection screen 44, and the second direction of projection is constituted of the second direction of illumination DD', the second projection plane being the plane of the projection screen 44.

The camera 34 is designed to capture an image from a view of the screen 44 and to transmit it to the unit 14.

The signal analysis and processing unit 14 is designed to collect the images captured by the video imaging system 12 and to generate the information characteristic of said images.

The operation of the device 4 according to this embodiment of the invention will now be described.

Initially, the operator performs two separate calibrations.

The first calibration consists of visibly identifying the centre of rotation O of the support plate 6. In order to do this, the operator draws an identifying reference mark on the support plate 6, for example a point, off centre from the axis of rotation 17. Then by means of the actuator 16, the support plate 6 is caused to turn by 120°, three times, with only one of the light sources 36, 38 being turned on. For each angular position of the support plate 6, the analysing unit 14 records the position, as viewed by the camera 34, of the centroid of the shadow of the identifying reference mark on the screen 44. The analysing unit 14 thus obtains one triangle and calculates the position of the centroid of said triangle. This centroid constitutes the intersection of the axis of rotation 17 with the projection screen 44 and is used as a reference point of the projection screen 44.

By way of a variant, the identifying reference mark is a constituent element of the support plate 6. The first calibration is thus automatic, that is to say that the steps of rotation of the support plate 6 and recording of the position of the identifying reference mark is done automatically, without intervention by the operator.

The second calibration consists of a metric calibration of the camera 34. In other words, each pixel of the screen of the camera 34 is assigned a metric value as measured at the level of the support plate 6. For this purpose, the operator places gauges whose sizes are known on the support plate 6.

Then, the glass 8 is placed on the support plate 6 on one of the surfaces thereof, which is concave or convex, according to the needs of the operator.

If the glass 8 is placed on its concave surface, the acquisition to be effected will concern the form contour and the curve of its convex surface. If the glass 8 is placed on its convex surface, the acquisition to be effected will concern the form contour and the curve of its concave surface.

The glass 8 then takes an equilibrium position which depends on the form contour, the resting surface, and the internal and external curves thereof.

The illumination means 10 are then set in operation, preferably in an alternating manner. The illumination sources 36, 38 illuminate the glass 8 along different directions of illumination, thereby causing the formation on the projection screen 44 of two different shadows of the glass 8.

The camera 34 thus captures in the form of an image the shadows of the glass 8. These images are transmitted to the unit 14.

With reference to FIG. 4, the measurement unit 14 then measures, based on images captured, the following distances:

la distance $X''_1$, between the shadow $I^C$ of the point I, generated by the first light source 36 on the projection screen 44, and the reference point; and la distance $X''_2$, between the shadow $I^D$ of the point I, generated by the second light source 38 on the projection screen 44, and the reference point.

The unit 14 then calculates the height h of the point I in relation to the reference plane according to the following formula:

$$h = \frac{|X''_1 - X''_2|}{|\tan(\delta) - \tan(\gamma)|} - h_d,$$

where $h_d$ is the distance between the projection screen 44 and the support plate 6.

Then, the unit 14 calculates the distance d from the point I to the axis of rotation 17 of the support plate 6 according to the following formula: $d=(h+h_d)*\tan(\gamma)+X''_1$ Finally, the unit 14 visibly identifies the position of the point I in relation to the axis of frame mounting of the glass 8.

Preferably, in the case where the field of view of the camera 34 covers a diameter of the glass 8, the unit 14 also measures the distance of each shadow from the point I to the reference point. The unit 14 then derives from said measurements the height h' of the point I' relative to the reference plane and the distance d' from the point f to the axis of rotation 17 by means of formulas similar to those specified here above.

It should be noted that, in the formula given here above, it was assumed that the support plate 6 was of zero thickness. The person skilled in the art will know how to adapt this formula without any problem in order to take into account the thickness of the support plate 6.

The unit 14 transmits the information relating to the heights h, h', the distances d, d' and the positions of the points I, I' to the control module 22.

The control module 20 then commands the rotation of the support plate 6 by a predetermined angle, for example by 1°. The camera 34 then captures a new image, based on which the unit 14 calculates the heights h, h' of other points I, I' of the form contour of the glass 8 in relation to the reference plane, as well as the distances d, d' from said other points I, I' to the axis of rotation 17, and visibly identifies the positions of said other points I, I' in relation to the frame mounting axis. Then the support plate 6 is again driven in rotation.

These steps are repeated until the radius R or the diameter Ø has traversed the entire form contour of the glass 8.

The total rotation of the support plate 6 necessary to complete this course is 360° if the field of view of the camera 34 is limited to only the radius R. The total rotation of the support plate 6 necessary to complete this course is 180° if the field of view of the camera 34 includes le diameter Ø.

The device 4 according to the invention is thus particularly suited for reconstruct in a reliable fashion the form contour of the glass whatever be its orientation and regardless of the support used.

Indeed, the device 4 is structurally simple since it includes one camera 34 and two light sources 36, 38, which are easily acquired and arranged around a support 6 for the glass 8 under study. In addition, the device 4 is more compact.

The obtaining, for each position of the glass relative to the reference elements of the light sources 36, 38, of an image of two different shadows, makes it possible to retrieve two data items that pertain to each of the different distances between the same identifying reference marks I and O. Such two dimensional data items, cross referenced over the same image, make it possible to obtain information on a third dimension in space, that is the heights h, h' orthogonal to the reference plane of the first two data items.

One single image of a horizontal reference plane thus provides the ability to obtain a vertical distance of the form contour of the glass 8 from the reference plane.

The shape in space of the form contour of the glass is then reconstructed without any particular technical difficulty, and it constitutes a valuable information item for the optician.

By making use of the invention described here above, it is possible to reconstruct the three dimensional form of the contour of the glass 8. The operator is thus free to place the glass 8 on the support plate 6 in any position whatsoever.

The curvature of the upper surface of the glass being known, it is in addition possible to reconstruct the entire upper surface of the glass. The devices 2, 4 according to the invention are therefore particularly suitable and capable of cutting an optical glass that is identical to the glass used in said devices.

What is claimed is:

1. A data acquisition and measuring device for acquisition and measurement of geometric data for at least one form motif associated with a glass for a spectacle frame, for the manufacture of ophthalmic lenses, similar or complementary to the glass, the device comprising:
    a support configured for holding the glass;
    an illuminator for illuminating the support;
    a video imaging system for capturing images oriented towards the support and configured for capturing, for each position of the glass placed on the support relative to the video imaging system and to the illuminator, at least two images of the contour of said glass; and
    a signal analyzer and processor receiving as an input each image captured by the video imaging system, the analyzer and processor being configured for measuring the distance from at least one point of the form contour of the glass to a reference plane based on said images,
    wherein a first of said images is the projection of the form contour of the glass along a first direction of projection, on a first plane of projection, a second of said images is the projection of the form contour of the glass, along a second direction of projection, on a second plane of projection, and the first and second directions of projection form a non-zero angle therebetween.

2. The device as recited in claim 1 including a transporter for moving the support about an axis of rotation of the support relative to the video imaging system or the illuminator.

3. The device as recited in claim 2 wherein the reference plane is orthogonal to the axis of rotation of the support.

4. The device as recited in claim 1 wherein the first and second directions of projection form a plane containing a normal to the reference plane.

5. The device as recited in claim 1 wherein the video imaging system is configured for viewing the form contour of the glass along a first and a second sighting axis, the first image being constituted of the view of the form contour of the glass along the first sighting axis and the second image being constituted of the view of the form contour of the glass along the second sighting axis.

6. The device according to claim 1 wherein a projection screen is interposed between the video imaging system and the support, in that the illuminator is configured for illuminating the glass along a first and a second direction of illumination, and the first image is formed by the shadow of the form contour of the glass on the projection screen as a result of the illumination of the glass along the first direction of illumination, the second image being formed by the shadow of the form contour of the glass on the projection screen as a result of the illumination of the glass along the second direction of illumination.

7. A data acquisition and measurement method carried out with a data acquisition and measuring device for acquisition and measurement of geometric data for at least one form motif associated with a glass for a spectacle frame, for the manufacture of ophthalmic lenses, similar or complementary to the glass, the device comprising:
    a support configured for holding the glass;
    an illuminator for illuminating the support;
    a video imaging system for capturing images oriented towards the support and configured for capturing, for each position of the glass placed on the support relative to the video imaging system and the to the illuminator, at least two images of the contour of said glass; and
    a signal analyzer and processor receiving as an input each image captured by the video imaging system, the analyzer and processor being configured for measuring the distance from at least one point of the form contour of the glass to a reference plane based on said images,
    the method including the following steps:
    providing the glass, the glass having a form contour appropriately adapted to the frame and two surfaces;
    placing the glass in an initial position on the support of the data acquisition and measurement device;
    capturing images of the glass, the glass remaining in its initial position, a first of said images being the projection of the form contour of the glass along a first direction of projection, on a first plane of projection, a second of said images being the projection of the form contour of the glass, along a second direction of projection, on a second plane of projection, the first and second directions of projection forming a non-zero angle therebetween; and
    measuring the distance from at least one point of said form contour to the reference plane based on the first and second images.

8. The method as recited in claim 7 wherein the video imaging system is configured for viewing the form contour of the glass along a first and a second sighting axis, the first image being constituted of the view of the form contour of the glass along the first sighting axis and the second image being constituted of the view of the form contour of the glass along the second sighting axis, and the measuring step includes a sub step
    d1) of measuring the distance from one point of form contour of the glass contained in the plane defined by the first and second sighting axes to the reference plane, said sub step comprising of the following sub steps:
    d11) measuring the distance, viewed along the first sighting axis, between the point of the form contour and a reference point of the reference plane; and
    d12) measuring the distance, viewed along the second sighting axis, between the point of the form contour and the reference point of the reference plane.

9. The method as recited in claim 8 wherein the distance from the point of the form contour to the reference plane is given by the following formula:

$$h = \frac{\left| \frac{X'_2}{\cos(\beta)} - \frac{X'_1}{\cos(\alpha)} \right|}{|\tan(\alpha) - \tan(\beta)|}$$

where:
- h is the distance from the point of the form contour to the reference plane;
- α is the acute angle oriented from an axis normal to the reference plane to the first sighting axis;
- β is the acute angle oriented from an axis normal to the reference plane to the second sighting axis;
- $X'_1$ is the distance, viewed along the first sighting axis, between the point of the form contour and the reference point of the reference plane; and
- $X'_2$ is the distance, viewed along the second sighting axis, between the point of the form contour and the reference point of the reference plane.

10. The method as recited in claim 7 wherein a projection screen is interposed between the video imaging system and the support, the illuminator configured for illuminating the glass along a first and a second direction of illumination, the first image being formed by the shadow of the form contour of the glass on the projection screen as a result of the illumination of the glass along the first direction of illumination and the second image being formed by the shadow of the form contour of the glass on the projection screen as a result of the illumination of the glass along the second direction of illumination, and the measuring step includes a sub step d2) of measuring the distance from a point of the form contour of the glass contained in the plane defined by the first and second directions of illumination to the reference plane, said sub step comprising of the following sub steps:
   - d21) measuring the distance between a reference point of the projection screen and the projection along the first direction of illumination, of the point of the form contour on the projection screen; and
   - d22) measuring the distance between the reference point of the projection screen and the projection, along the second direction of illumination, of the point of the form contour on the projection screen.

11. The method as recited in claim 10 wherein the distance from the point of the form contour to the reference plane is given by the following formula:

$$h = \frac{|X''_1 - X''_2|}{|\tan(\delta) - \tan(\gamma)|} - h_d,$$

where:
- h is the distance from the point of the form contour to the reference plane;
- $h_d$ is the distance between the reference plane and the projection screen;
- γ is the acute angle oriented from an axis normal to the projection screen to the first direction of emission;
- δ is the acute oriented from an axis normal to the projection screen to the second direction of emission;
- $X''_1$ is the distance between the reference point of the projection screen and the projection along the first direction of illumination, of the point of the form contour on the projection screen; and
- $X''_2$ is the distance between the reference point of the projection screen and the projection, along the second direction of illumination, of the point of the form contour on the projection screen.

12. The method as recited in claim 10 wherein the projection screen is orthogonal to an axis of rotation of the support.

13. The method as recited in claim 7 including a step e) of moving the support about an axis of rotation of support.

* * * * *